United States Patent [19]

Maeng

[11] Patent Number: 5,596,563
[45] Date of Patent: Jan. 21, 1997

[54] BOTH-SIDES PLAYING OPTICAL DISC PLAYER

[75] Inventor: Hyun J. Maeng, Anyang-city, Rep. of Korea

[73] Assignee: Goldstar C., Ltd., Kyung Sangnam-Do, Rep. of Korea

[21] Appl. No.: 60,859

[22] Filed: May 12, 1993

[30] Foreign Application Priority Data

May 12, 1992 [KR] Rep. of Korea ............... 92-7994
Dec. 7, 1992 [KR] Rep. of Korea ............. 92-23504

[51] Int. Cl.⁶ ................................................. G11B 7/08
[52] U.S. Cl. ...................... 369/219; 369/215; 369/244
[58] Field of Search ........................... 369/75.2, 77.1, 369/195, 199, 215, 219, 244, 249, 220, 221, 258

[56] References Cited

U.S. PATENT DOCUMENTS

| | | | |
|---|---|---|---|
| 4,829,508 | 5/1989 | Arita | 369/215 |
| 4,839,881 | 6/1989 | Takahara et al. | 369/75.2 |
| 5,097,465 | 3/1992 | Funabashi et al. | 369/199 |
| 5,331,624 | 7/1994 | Park | 369/215 |

FOREIGN PATENT DOCUMENTS 1-227232 9/1989 Japan ............................. 369/100
2-66779 3/1990 Japan .

*Primary Examiner*—Stuart S. Levy
*Assistant Examiner*—William J. Klimowicz
*Attorney, Agent, or Firm*—Helfgott & Karas, P.C.

[57] ABSTRACT

A both-sides playing optical disc player includes a pickup carriage having a sliding motor, a power transfer gear for the motor, a pair of guide rollers, and a pickup carriage at a reproducing position. A pair of upper and lower rack elements are provided at a reproducing position, for moving the pickup carriage. A turning unit having a guide formed of a guide roller and rotating the pickup carriage along a nearest semicircle near an outer circle of the disc is provided. The turning unit has a turning plate rotated together with the pickup carriage using an additional turning motor. The sliding motor and the power transfer gear for moving the pickup carriage may perform turning by providing a U shaped rack element for the movement within the reproducing position. In case of turning with the turning plate, a cam curve portion having a variable curve portion is formed in the turning plate, and is followed by a rack element supporting element thereby enabling slope compensation according to a deflection of the disc.

4 Claims, 14 Drawing Sheets

FIG. 17
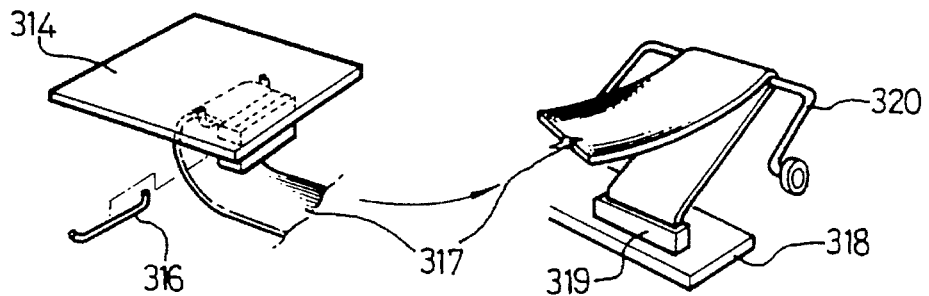
FIG. 18(A)     FIG. 18(B)
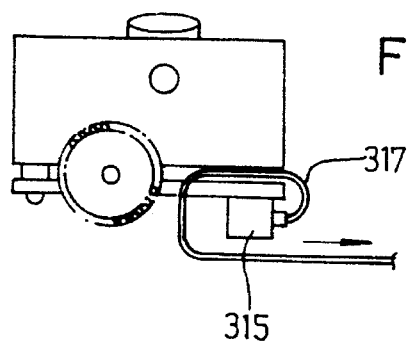 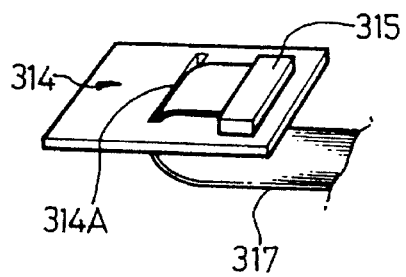
FIG. 19(A)     FIG. 19(B)
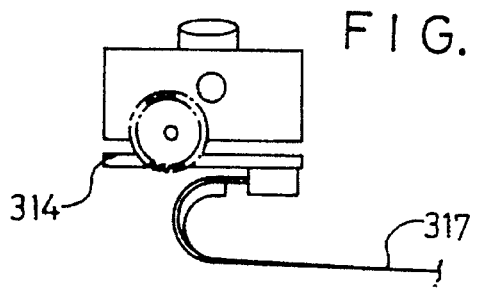 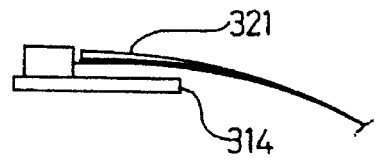

BOTH-SIDES PLAYING OPTICAL DISC PLAYER

BACKGROUND OF THE INVENTION

The present invention relates to a both-sides playing optical disc player, and more particularly to a both-sides playing optical disc player in which a pickup carriage and turning means are simplified and a connected structure of flexible cable is improved.

A conventional typical both-sides playing optical disc player is disclosed in Japanese laid-open Pat. No. Pyung 2-66779 (published on Mar. 6, 1990, filed with Patent Application No. Sho 3-216683). As shown in FIGS. 1 through 3, the disclosed optical disc player comprises a spindle motor 2 for driving at a constant speed, an optical disc 10 mounted on a turntable 1, a carriage 5 having pickup means 6, for being moved along a pair of guide elements 3 and 4 to reproduce a signal recorded on one side of the optical disc, and turning means for rotating the carriage to reproduce the other side of the disc. Also, the carriage 5 comprises a sliding motor 53, a slope compensating motor 54, and a height adjusting motor 55, and several elements for driving these three motors and transferring a power, as well as the pickup means 6 for reproducing the signal recorded on the optical disc. That is, as shown in FIG. 3, a horizontal movement gear 51 and a turning gear 52 for transferring a power of the sliding motor 53 when the carriage 5 moves horizontally and turns are provided in the carriage 5.

The slope compensating motor 54 makes the pickup means 6 fixed in a first case 61 keep a left-and-right slope using pins 62 and 63 protruded in both ends of the case as a hinge point, so as to compensate the slope of pickup means 6 according to deflection in disc rotation. Also, the height adjusting motor 55 prevents the phenomenon in that the edge of the carriage 5 may be collided with the deflected edge of disc when the carriage 5 turns into the opposite side of disc. At the same time, it enables height adjustment of pickup means 6 through a first moving element 64 to additionally compensate the height which is not sufficiently compensated through the slope compensating motor, when the slope of disc is large.

While the carriage 5 having the above constitution moves at a constant speed from an inner circle to an outer circle of the disc 10 by engagement-driving of the horizontal movement gear 51 driven by the power of the sliding motor 53 and the racks 31 and 41 formed along the pair of guide elements 3 and 4, it reads the signal recorded on the surface of disc.

At this time, the carriage 5 accurately moving in the horizontal direction along the pair of upper and lower guide elements 3 and 4 first reproduces the lower side of the optical disc 10 and then turns to reproduce its upper side. Since the turning gear 52 simultaneously rotates in the sliding motor 53 having the horizontal movement gear 51, it moves in gear along the inner side of a circular fixed gear 8, so that the carriage 5 is naturally turned.

The turning operation of the carriage 5 is described as follows. While the carriage 5 moves along the lower guide element 4, it reproduces the signal recorded on the lower side of disc 10. Then, the carriage is deviated from the lower guide element 4, and as it is completely engaged with the turning guide element 9, the turning gear 52 being rotated by the sliding motor 53, is in gear with its inner-sided fixed gear 8, thereby performing a planetary motion and accordingly performing the turning operation.

However, such a conventional optical disc player comprises several driving motors 53, 54 and 55 as a combined form within the carriage 5. The structural assembled form is very complicated. Also, the weight of carriage, itself, acts as a big problem in decreasing its moving speed and its search time.

Moreover, in turning up and down of the carriage 5 provided with the pickup means 6 to reproduce the both sides of disc 10, since turning is performed in being completely deviated from the disc 10, there is a problem in miniaturizing the device such that turning space corresponding to the length of carriage as well as disc installing space should be obtained. Since the carriage 5 rotates around the axis in parallel with the moving direction of the carriage in such a turning space, there is a problem in that the flexible cable for transmitting the signal read in the pickup means 6 to the main body is twisted.

Accordingly, to solve such conventional problems, the present applicant has filed Korean Patent Application No. 91-24277 on an pickup driving device of a both-sides reproducing multi-disc player, which comprises: a carriage having a sliding motor and a slope compensating motor, also a cam gear and a pickup means so as to be interlocked by the slope compensating motor; a cam gear having a cam curve on its upper surface to simultaneously control slope compensation and height adjustment of the pickup means by being supplied with the power of the slope compensating motor, and having a peripheral gear and a contact protruded portion be protruded as one body, in its periphery; a lift guide mounted with a pickup base having the pickup means and hinge-combined with one end of the carriage, thereby compensating a height and a slope along the cam curve; and a mode switch for determining a turning position by sensing a position of contact protrusion on the cam gear.

The previously applied invention of this applicant improves the reliability of operation by the simplification of elements and power transfer system, and also has an effect of fast search and largely reduced power consumption of motor by reducing the overall weight of carriage.

However, in the invention (the reproducing optical disc player) previously applied by this applicant, the turning structure of pickup module is complicated, and the size is large, so that the improvement is required to miniaturize the product. Also, there is a problem in that the flexible cable may be twisted, and the whole length of cable is longer. Moreover, many elements are needed and its simplified constitution cannot be easily obtained, and the height of product is increased to obtain the radius of curvature of flexible cable.

SUMMARY OF THE INVENTION

The present invention is invented to solve such conventional problems, and it is a main object of the present invention to provide an optical disc player exclusively used for a single side or used compatibly for both sides, in which the weight of pickup carriage to be moved along a pair of guide elements to reproduce a signal recorded on the surface of optical disc is reduced, thereby having a fast search and an improved reliability of operation.

It is another object of the present invention to provide an optical disc player having an easy operation for simultaneously performing the compensation of slope and the adjustment of height by constituting a slope compensating motor and a turning motor as a single motor.

It is still another object of the present invention to provide an optical disc player minimizing the space according to turning of pickup carriage.

It is yet another object of the present invention to provide a control method of an optical disc player for accurately sensing and reproducing a signal recorded in a disc and also simultaneously controlling the up-and-down slope in the outside of pickup carriage.

It is a further object of the present invention to provide an optical disc player in which the radius of curvature of flexible cable is minimized to miniaturize the optical disc player, and also its flexible cable is not twisted during turning.

To achieve the objects, the present invention comprises:

a pair of upper and lower supporting means;

a pickup carriage comprising a single sliding motor, at least a single power transfer gear for transferring a power of the sliding motor, pickup means, and first guide means;

at least a pair of upper and lower rack elements respectively mounted in the upper and lower supporting means, for moving the pickup carriage at least within a disc reproducing position by being in gear with the power transfer gear of the pickup carriage;

second guide means mounted in the upper and lower supporting means, for guiding movement of pickup carriage within a disc reproducing position by being mutually worked with the first guide means of the pickup carriage;

turning means for rotating the pickup carriage at a reproduction completed position along a semicircle near an end of disc around an axis perpendicular to a moving direction of pickup carriage and parallel to the disc surface; and third guide means for guiding turning of pickup carriage by being mutually worked with the first guide means of the pickup carriage.

Also, the first guide means can comprise a guide hole formed in a moving direction of the pickup carriage, and at least a pair of front and rear guide rollers provided in the outside of the power transfer gear. The second guide means can comprise at least a pair of upper and lower guide elements being in sliding-contact with the guide hole, for guiding the pickup carriage along the moving direction within the reproducing position of the both sides of disc, and at least a single upper-sided roller guide being in rolling-contact with the guide roller, for guiding and supporting the pickup carriage. The turning means can comprise at least a single turning plate having a pickup synchronizing hole for being inserted with the guide roller when the pickup carriage is moved to the turning position after completion of reproduction, and a turning motor and power transfer gears for rotating the turning plate, and at least a single guide plate for preventing the deviation of pickup carriage during turning.

Also, the upper and lower supporting means can comprise a pair of upper and lower frames fixed with the rack element and the second guide means, a pair of left and right brackets for connecting one-sided ends of upper and lower frames with a hinge to rotate the upper and lower frames in an end of disc, and a guide shaft fixed in the other ends of the upper and lower frames. The guide shaft inserting cam curve constituted by a variable curve portion for compensating a slope according to deflection of disc by rotating the frame and a concentric circle portion excluding the variable curve portion can be formed in the turning plate, which can be rotated by the turning motor and its power transfer gears to position a guide shaft on the cam curve at a position corresponding to the deflection of disc.

Also, the present invention comprises the steps of:

inserting a disc in a turntable;

setting a reproducing position of inserted disc and detecting a reproducing signal;

performing a play mode by a pickup carriage to reproduce one side between upper and lower sides of said disc according to said detected reproducing signal;

accurately positioning a turning plate at a turning position by a photo sensor, thereby rotating said pickup carriage arrived at a turning position after completion of reproduction for said one side;

being in ready for turning by connecting the pickup carriage into a pickup synchronizing hole of turning plate;

turning said pickup carriage into a position for reproducing the other side between the upper and lower sides of the disc by rotating the turning plate connected to the pickup carriage by 180°;

moving quickly said pickup carriage into a position for reproducing the other side of disc after separating the pickup carriage from the turning plate when the turning is completed;

performing a play mode at a reproducing position of the other side; and performing re-repeated continuous reproduction after reproduction of the other side is completed.

In this method, a step of quickly moving the pickup carriage into a turning position with stopping reproduction even before the completion of reproduction, if a selection mode for reproducing the other side being different from the reproduced disc side, during playing, can be included in the play mode performing steps.

Also, to achieve the above object of the present invention, a both-sides playing optical disc player is provided, in which the first guide means comprises a guide hole formed along a moving direction of pickup carriage in the pickup carriage and at least a pair of front and rear guide rollers provided in the outside of the power transfer gear;

the second guide means comprises at least a pair of upper and lower guide elements being in sliding-contact with the guide hole, for guiding the pickup carriage along the moving direction within a reproducing position of disc both-sides, and at least a single upper roller guide being in rolling-contact with at least one guide roller between the pair of guide rollers, for guiding and supporting the pickup carriage at least within an upper-disk reproducing position; and the turning means comprises at least a single U-shaped rack element formed as one body with the upper and lower rack elements which are connected in a U shape in an end near an outer circle of disc; and the third guide means comprises at least a single roller guide hole formed as one body with the U-shaped rack element, for guiding the pickup carriage during turning by being in rolling-contact with the guide roller of the first guide means;

whereby the turning of pickup carriage is performed by the sliding motor, by means of the power transfer gear, the U-shaped rack element, the guide roller, and the roller guide hole.

Also, the guide roller being in rolling-contact with the upper roller guide can be combined at an adjustable position.

To achieve other objects of the present invention, the present invention provides a connected structure of a flexible cable in a both-sides playing optical disc player which comprises:

a print circuit substrate fixed on a lower surface of the pickup means;

a flexible cable whose one end is connected to the printing circuit substrate;

an RF board attached to the supporting means at the outside of turning means and having a connector connected to the other end of the flexible cable; and spring means between the RF board and the turning means, for keeping the flexible cable at a middle height between an upper-side reproducing position and a lower-side reproducing position.

BRIEF DESCRIPTION OF THE DRAWINGS

The above objects and other advantages of the present invention will become more apparent by describing the preferred embodiments of the present invention with reference to the attached drawings, in which;

FIGS. 17, 18A, 18B, 19A, and 19B are schematic views showing other embodiments of connected structure of flexible cable shown in FIG. 16.

DETAILED DESCRIPTION OF THE INVENTION

Figure 1:
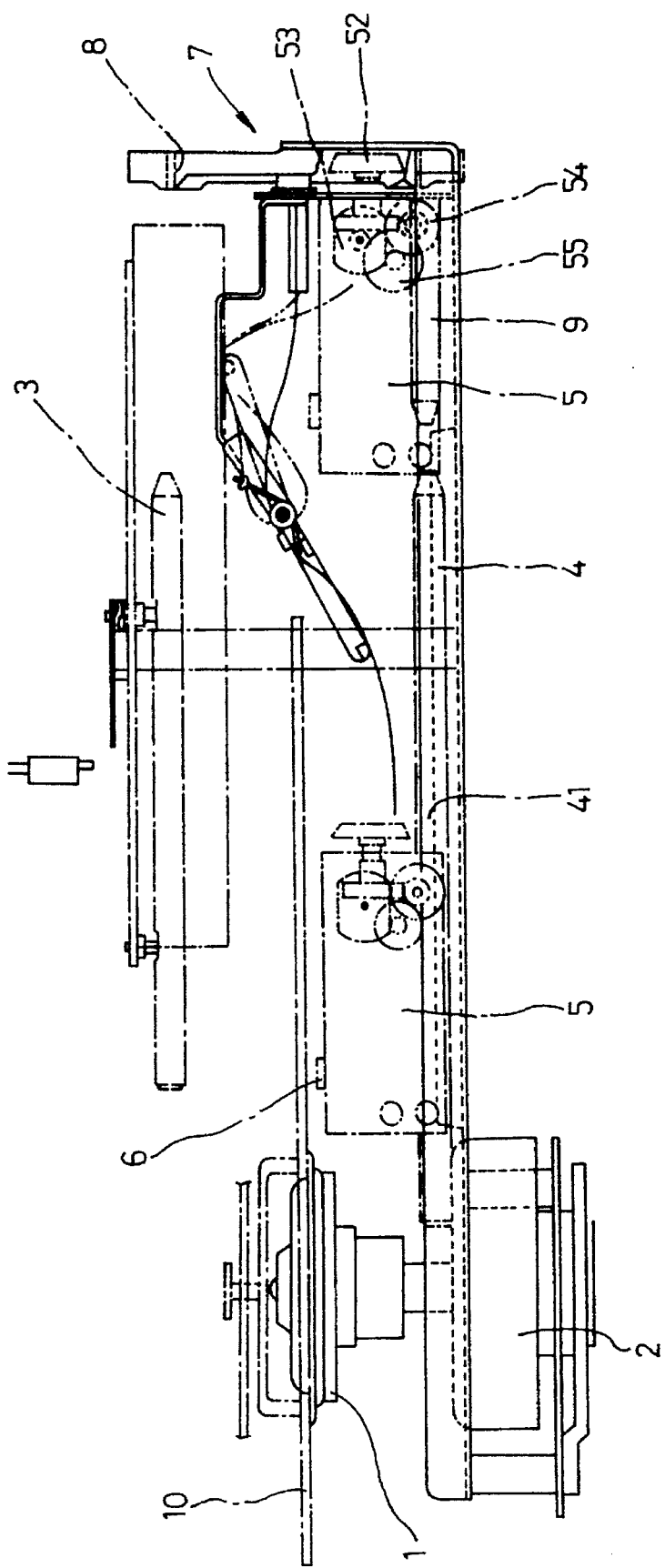
FIG. 1 is a schematic side view showing a conventional both-sides playing optical disc player.
Figure 2:
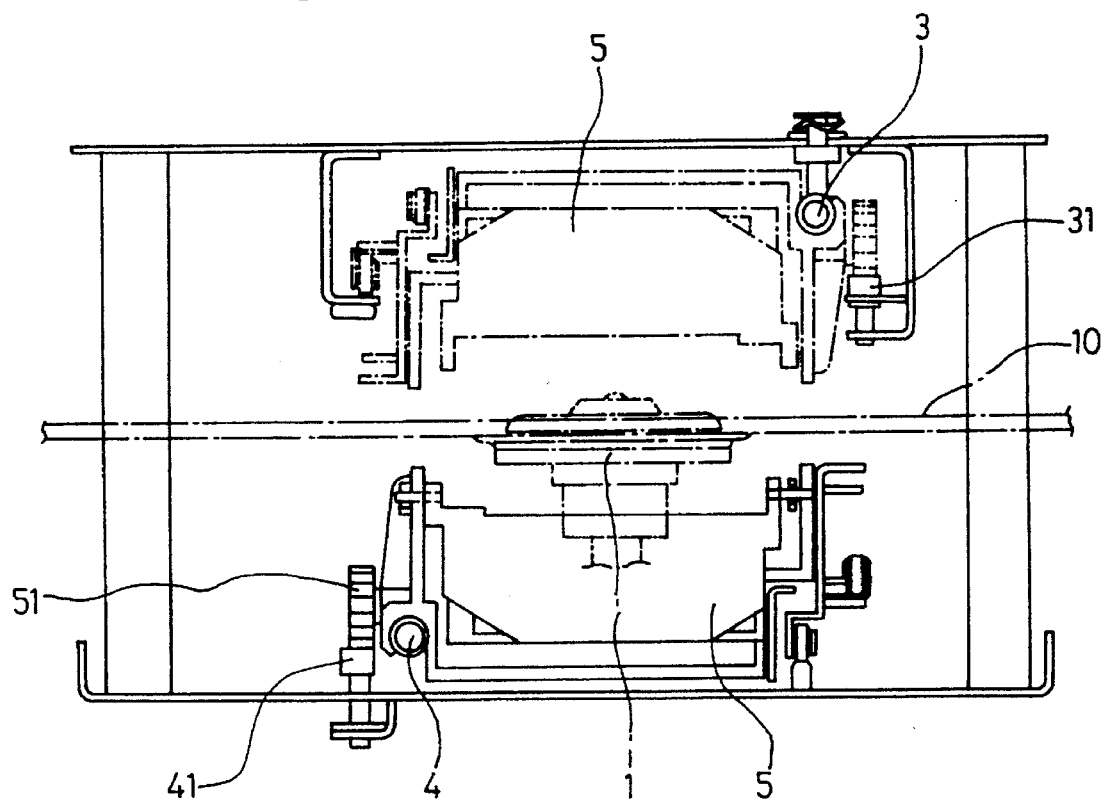
FIG. 2 is a schematic front view of FIG. 1.
Figure 3:
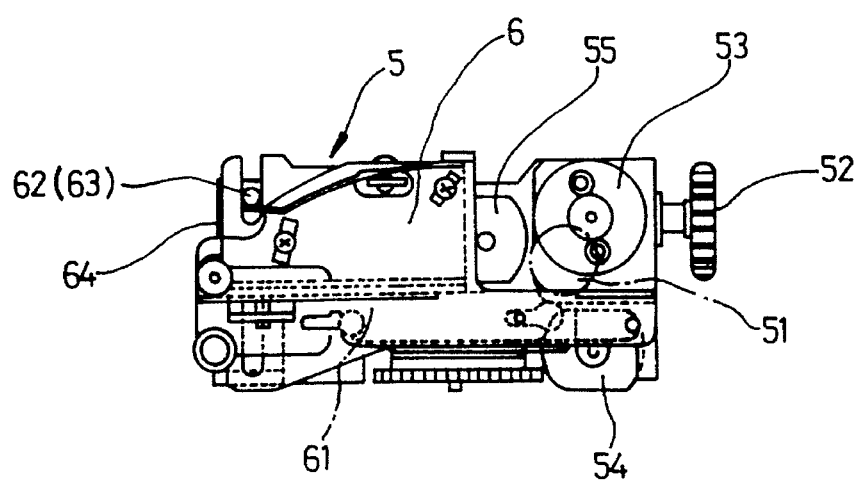
FIG. 3 is a schematic side front view showing the constitution of a conventional pickup carriage.
Figure 4:
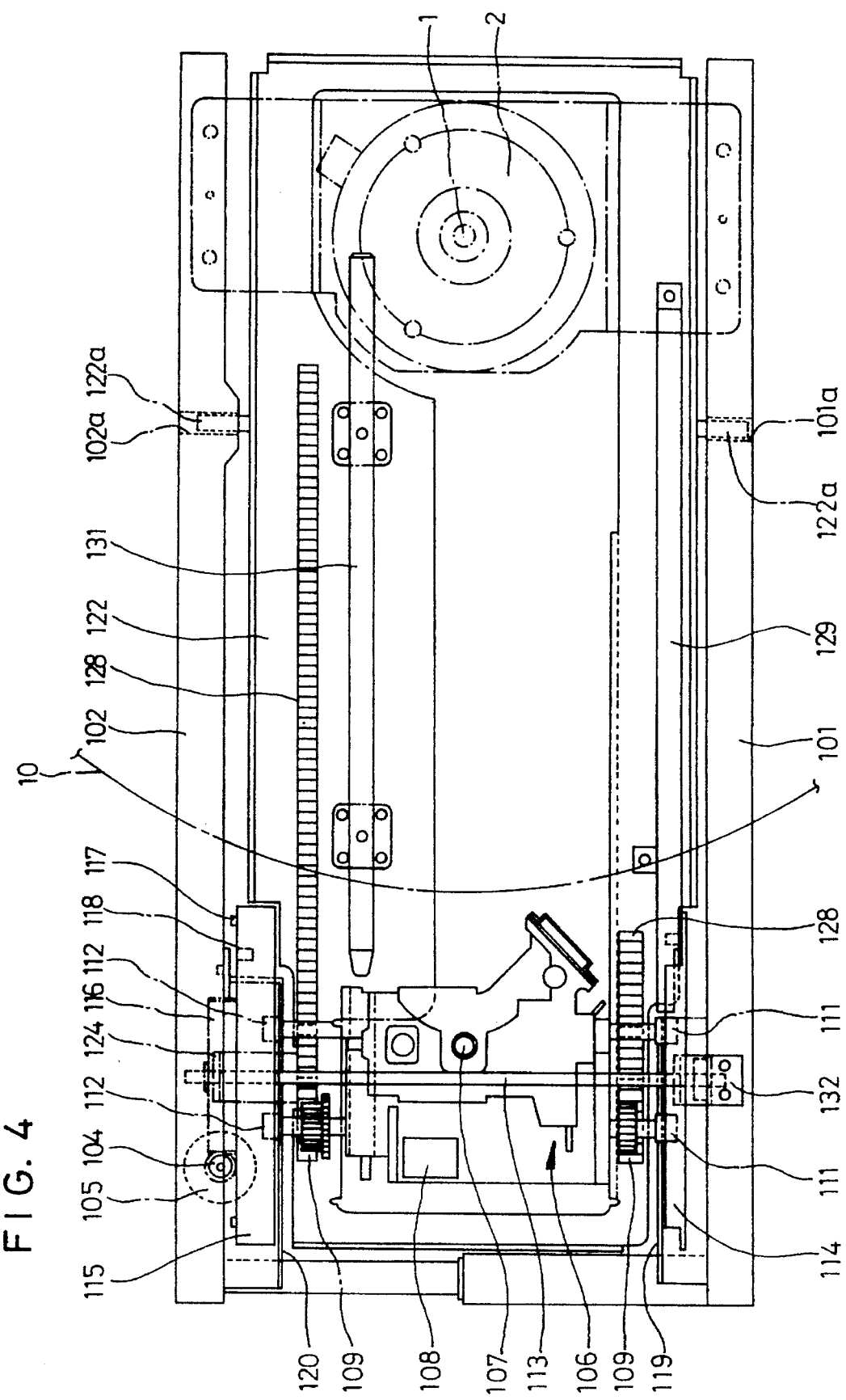
FIG. 4 is a schematic plan view showing the constitution of a both-sides playing optical disc player according to an embodiment of the present invention.
Figure 5:
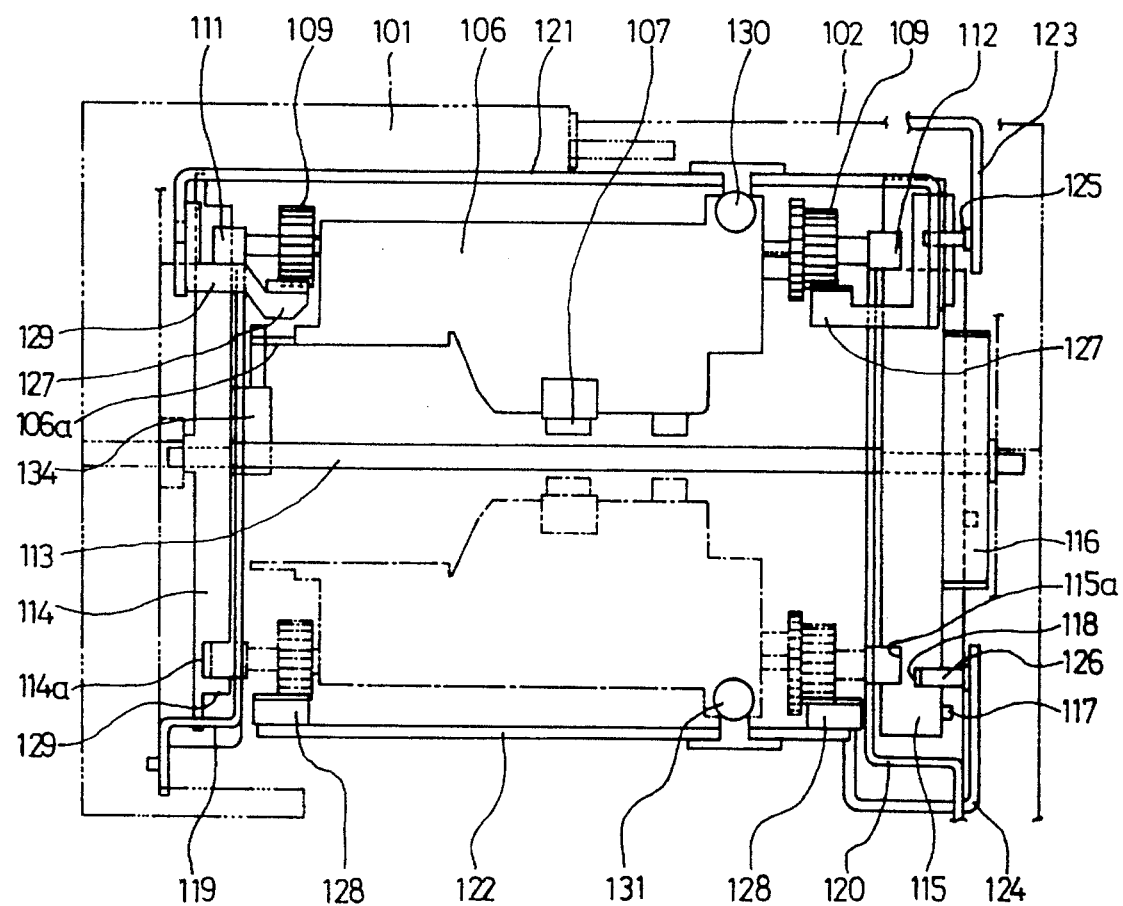
FIG. 5 is a schematic front view of FIG. 4.

As shown in FIGS. 4 through 10, an optical disc player according to an embodiment of the present invention comprises a pair of left and right brackets 101 and 102 for being connected to be a pair, and a slope compensating and turning compatible motor 105 for having a worm 104 along a motor driving shaft on its one side. Meanwhile, a pair of turning plates 114 and 115 mounted in a rotation synchronizing shaft 113 are mounted in such a bracket assembly and guide plates 119 and 120 are respectively mounted in the inner side of these turning plates 114 and 115.

Also, a cam curve 118 for adjusting height of upper and lower frames 121 and 122 is comprised in a right-sided turning plate 115 having a worm gear 116 to be driven in gear with the worm 104. This cam curve is constituted to be divided into a concentric circle portion and a variable curve portion. Also, a stopper pin 117 is constituted on the outer circumference of the right-sided turning plate 115 to be regulated by a stopper protrusion 103 extended from the right bracket 102.

A pickup sensing switch 134 is attached in the left-sided turning plate 114, thereby sensing a turning position by being in contact with the protruded pin 106a protruded in one side of the pickup carriage 106. Meanwhile, a sensing hole 133 is formed on the peripheral portion of the left-sided turning plate 114 to detect a sensing position by a photo sensor 132 fixed on the bracket 101. But, it is preferred that a wire of pickup sensing switch 134 attached on the inner surface of the left-sided turning plate 114 is drawn out through a passing hole 135 punched in the turning plate 114, thereby preventing hindrance in operation steps.

Then, upper and lower frames 121 and 122 are assembled to make the hinge shafts 121a and 122a pivotally fixed into the hinge holes 101a and 102a punched in the bracket 101. Here, the guide shafts 125 and 126 fixed in the extended pieces 123 and 124 of the frames 121 and 122 are inserted into the cam curve 118 of the turning plate 115. The slope of frames 121 and 122 is controlled, as the guide shafts 125 and 126 move up and down along the variable curve portion of the cam curve 118.

The frames 121 and 122 are loaded with the rack elements 127 and 128, the roller guide 129, and the upper and lower guide elements 130 and 131, thereby smoothly carrying out a horizontal movement of the pickup carriage 106 moving along the upper and lower frames 121 and 122.

In the inside of the pickup carriage 106 which is regulated not to be deviated by the upper and lower guide elements 130 and 131 and is movable along the rack elements 127 and 128, and the roller guide 129, pickup means having an object lens 107 and its sliding motor 108 are comprised. In the outside of the pickup carriage 106, a power transfer gear 109 being connected with a decelerating gear to the sliding motor 108, for providing a driving force to the pickup carriage, and guide rollers 111 and 112 for guiding the pickup carriage 106 during movement and also for being guided by being inserted into the pickup synchronizing holes 114a and 115a of the turning plates 114 and 115 during turning.

Accordingly, as the power transfer gear 109 is guided along the rack elements 127 and 128 by a power of the sliding motor 108, the pickup carriage 106 can reproduce the record signal of the disc 10 mounted on the turntable 1.

According to an embodiment of the present invention having the above constitution, first of all, the optical disc 10 is placed on the upper surface of the turntable 1 driven by the spindle motor 2. Then, if a power is supplied to the sliding motor 108 within the pickup carriage 106 in playing, the power transfer gear 109 connected with a decelerating gear to the sliding motor 108 is rotated in gear with the rack element 128 on the lower-sided frame 122, thereby horizontally moving the pickup carriage 106. At this time, the pickup carriage 106 accurately guided by the lower guide element 131 moves from the inner circle to the outer circle of the lower side 10a of disc, thereby reproducing the recorded signal. The right side of such a pickup carriage 106 is guided with being inserted into the lower guide element 131, and in its outside, a pair of guide rollers 111 and 112 are guided along the rack element 128 and the roller guide 129. Meanwhile, if the disc placed on the turntable 1 is a little bit deflected by tare in moving to the outer circle, the pickup carriage 106 also needs compensation corresponding to the slope. The slope compensation is performed as follows. A direction of slope and a degree of slope in the disc are sensed by a slope sensing sensor (not shown) mounted within the pickup carriage 106, and then the slope compensating and turning compatible motor 105 is rotated forwardly and backwardly by moving the guide shafts 125 and 126 into the position within the variable curve portion of the cam curve 118, i.e., an interval "B-C-D-E". Accordingly, the upper and lower frames 121 and 122 fixed pivotally around the hinge shafts 121a and 122a are adjusted with a desired angle. At this time, since the stopper pin 117 on the right-sided turning plate 115 is in a reverse-rotation prevented state by being in contact with the stopper protrusion 103 of the bracket 102, the rotation limited into one direction is enabled by the counterclockwise rotation of the turning plate 115, so that the desired slope compensation can be done.

Figure 7:
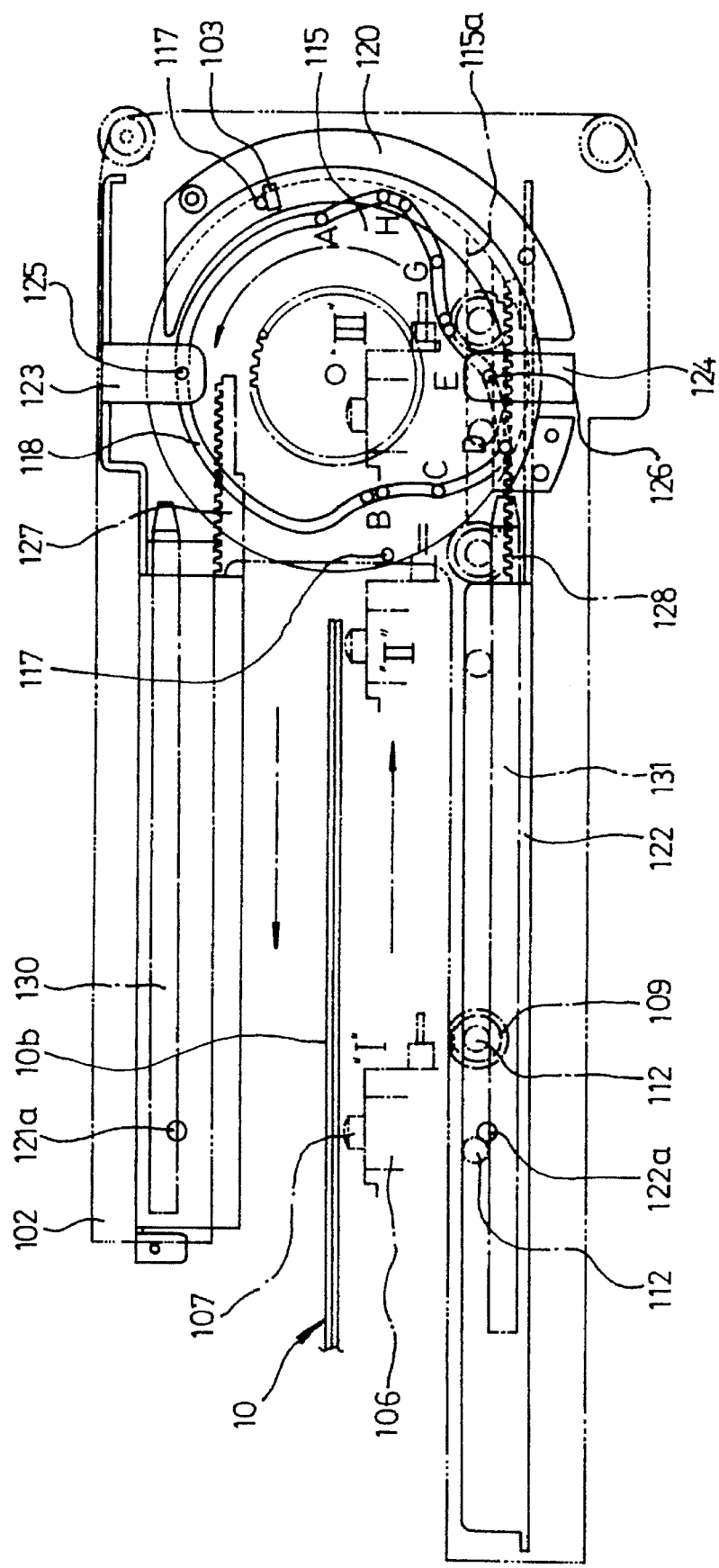
FIG. 7 is a schematic right-sided view of FIG. 5.
Figure 8:
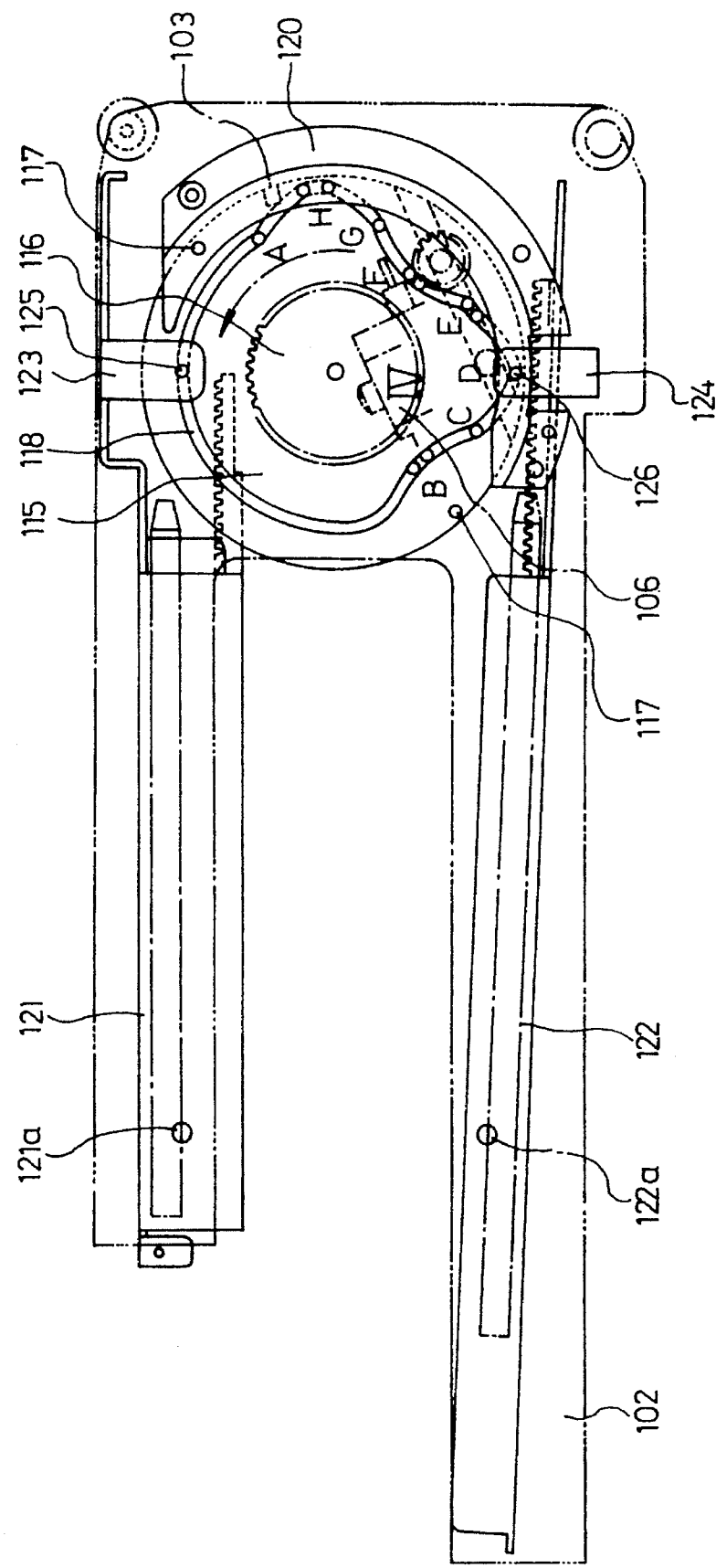
FIG. 8 is a schematic right-sided view which is similar to FIG. 7 describing a turning step of pickup carriage according to the embodiment.
Figure 9:
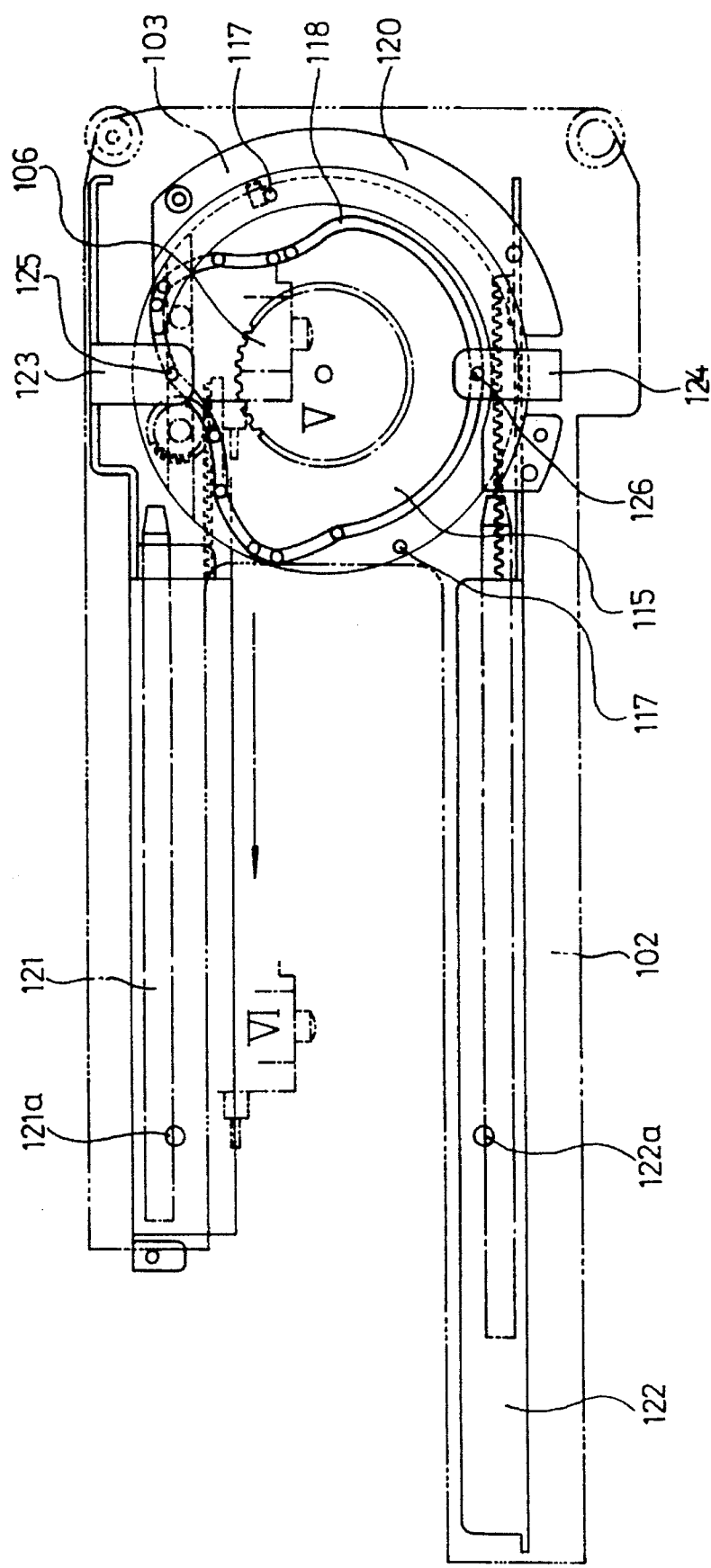
FIG. 9 is a schematic right-sided view which is similar to FIG. 7 showing the turning completed state of pickup carriage.
Figure 10:
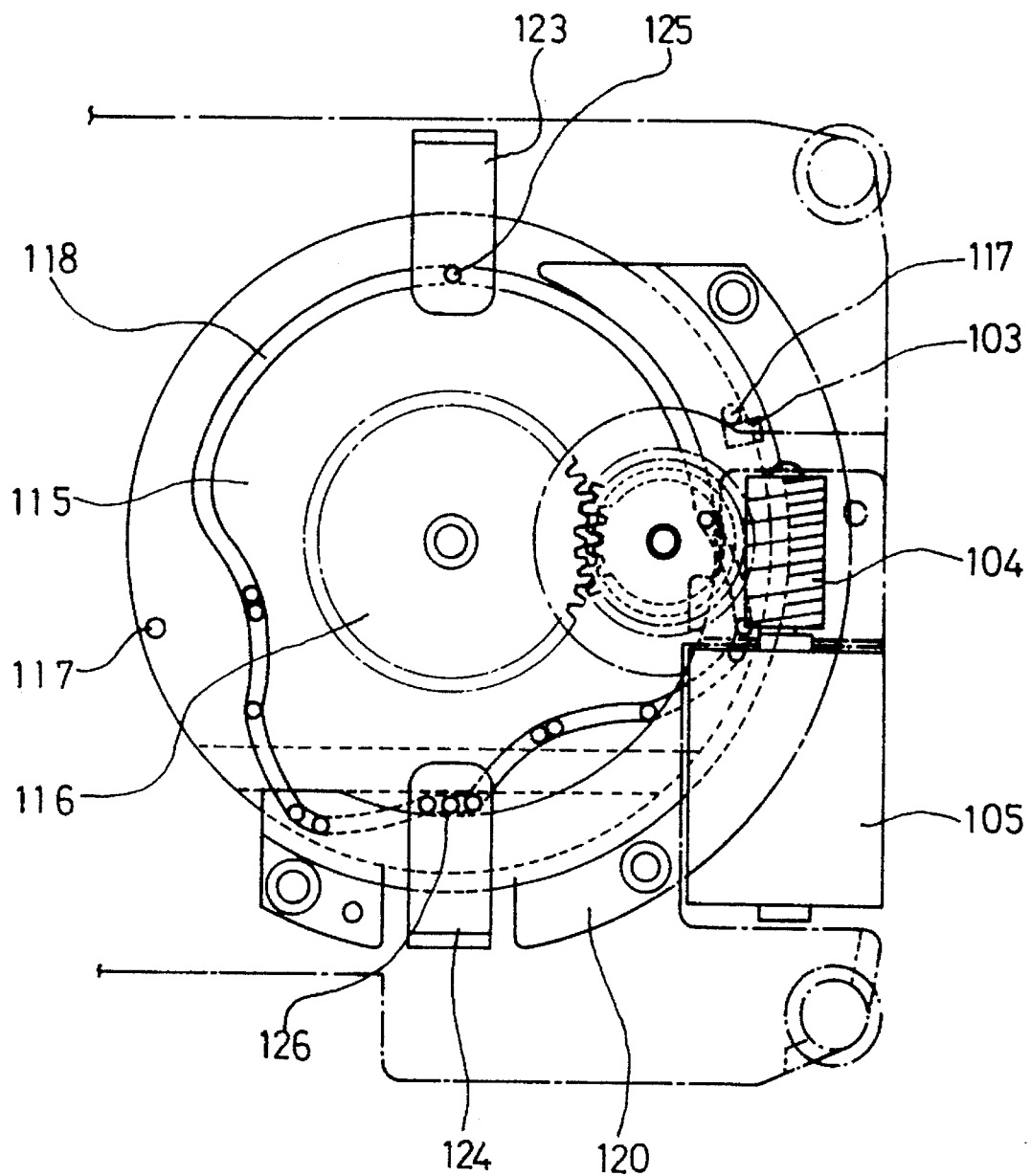
FIG. 10 is a detailed diagram of a power transfer portion for turning according to the embodiment.

After the reproduction of disc lower side 10a is completed with the slope adjustment, the pickup carriage 106 completes the movement from a "I" position to a "II" position shown in FIG. 7 and the sliding motor 108 is stopped, thereby being ready for turning.

During turning, the lower-sided frame 122 mounted with the pickup carriage 106 and the upper-sided frame 121 should be at a level, and the slope compensating and turning compatible motor 105 rotates forwardly and backwardly for keeping the level of the lower frame 122.

That is, if a position of the sensing hole 133 is detected using the photo sensor 132, the guide shafts 125 and 126 fixed in the upper and lower frames 121 and 122 are fixed in the concentric circle position on the cam curve 118 of the right-sided turning plate 115, so that the upper and lower frames are all at a level.

After the position of turning plate 115 needed in turning through the above step is determined, the sliding motor 108 within the pickup carriage 106 rotates, thereby moving the pickup carriage 106 into the "III" position of FIG. 7.

While the pickup carriage 106 moves from the "II" position to the "III" position, the both-sided guide rollers 111 and 112 of the pickup carriage 106 are respectively inserted into the pickup synchronizing holes 114a and 115a on the turning plates 114 and 115, and then follows the track of left and right guide plates 119 and 120 during turning. Accordingly, during the rotation of the turning plates 114 and 115, with keeping the fixed mode regulated by the pickup synchronizing holes 114a and 115a and the left and right guide plates 119 and 120 as they are, the pickup carriage 106 is turned into a "V" position of FIG. 9 via a "IV" position of FIG. 8.

Also, when the pickup carriage 106 is inserted into the pickup synchronizing hole 115a by being moved from the "II" position to the "III" position, if the protruded pin 106a of the pickup carriage 106 makes a contact with the pickup sensing switch 134 on the turning plate 114, the sliding motor 103 is stopped, thereby inhibiting any more forward movement, and on the other hand, the slope compensating and turning compatible motor 105 starts a counterclockwise rotation (a clockwise rotation in FIG. 6), thereby rotating the pickup carriage 106 by 180°. At this time, it is preferred that the stopper pin 117 is protruded by an interval of 180° on the right-sided turning plate 115 to prevent the phenomenon such that the turning plate 114 is further rotated by an inertia force after the photo sensor 132 senses the 180° rotation.

Meanwhile, the both-sides guide rollers 111 and 112 are inserted into the turning plates 114 and 115, so that the pickup carriage 106 rotating with the turning plates 114 and 115 is regulated not to be deviated from the fixed mode by the left and right guide plates 119 and 120. The pickup carriage 106 ending the turning goes straight to the inner side of the disc 10 along the upper guide element 130 and the rack element 127 comprised in the upper-sided frame 121 and reaches the "VI" position of FIG. 9. Then, it senses the reproducing position of the upper surface 10b of disc and then is stopped.

Then, as described above, the upper side 10b of disc is reproduced in a forward direction from the "VI" position of the inner side of disc 10 to the "V" position of its outside.

At this time, during reproduction of the upper side of disc, since the cam curve 118 of the turning plate 115 keeps the state of being rotated by 180°, the slope is compensated using the interval "E-F-G-H-A" of the second variable curve portion on the cam curve 118 and the sliding is performed by the same method as in the reproduction of lower side of disc.

Figure 11A:
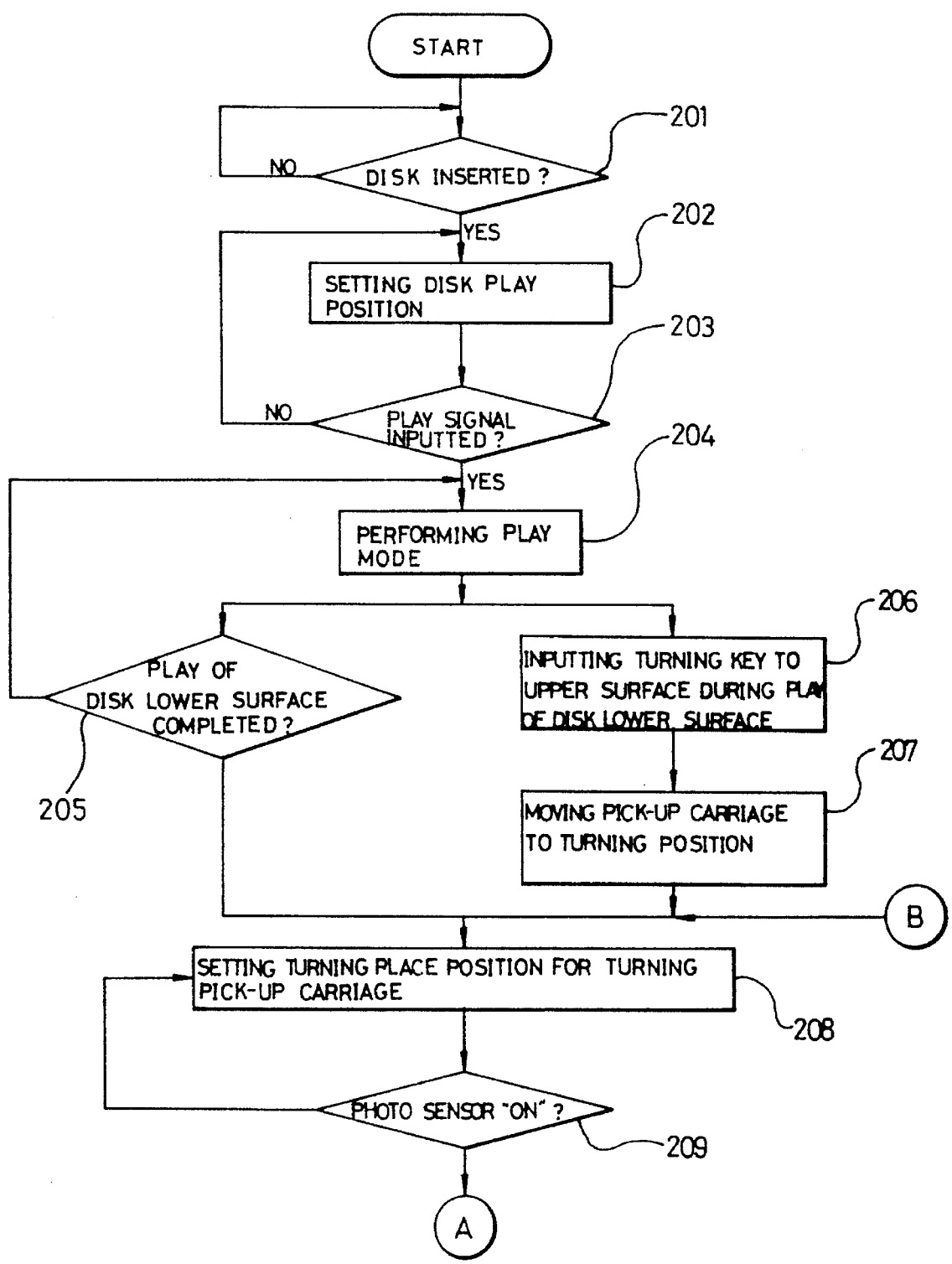
FIGS. 11A and 11B show flow charts describing the operating steps of the present invention, and the turning steps of pickup carriage according to the embodiment.
Figure 11B:
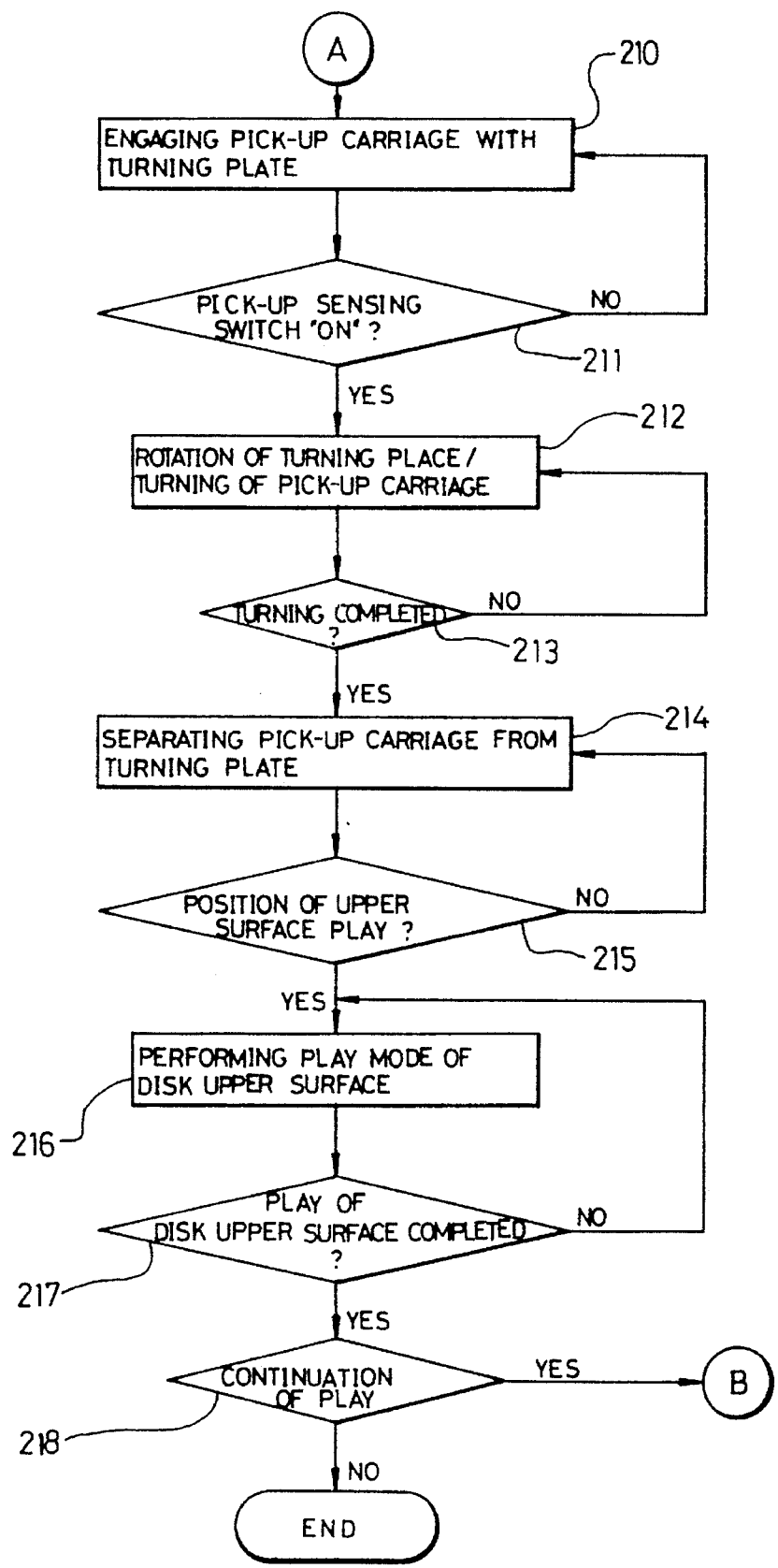
Figure 12:
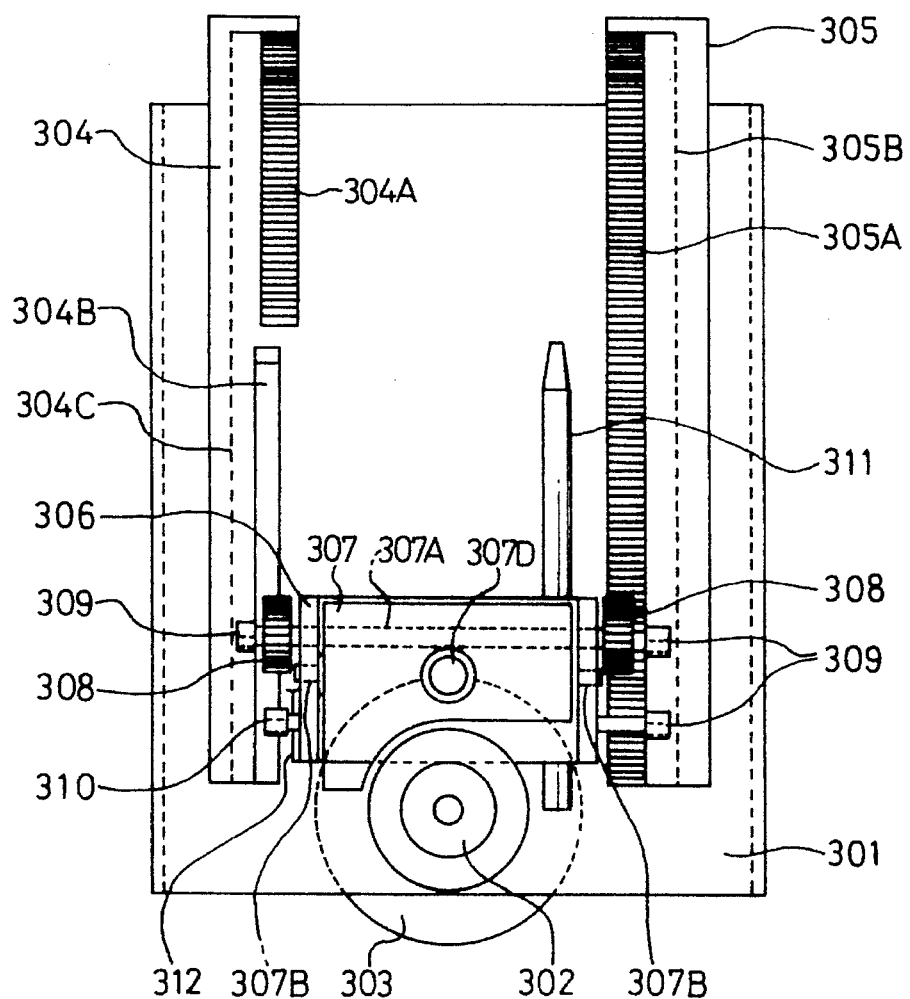
FIG. 12 is a schematic plan view showing the both-sides playing optical disc player according to another embodiment of the present invention.
Figure 13:
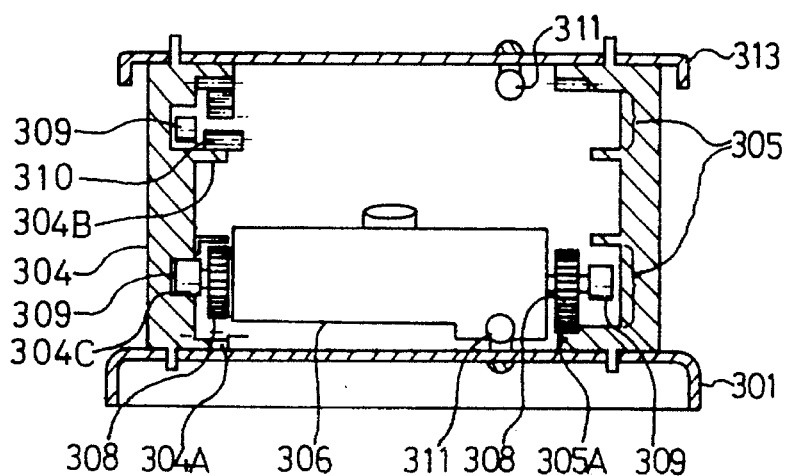
FIG. 13 is a schematic front view of FIG. 12.
Figure 14:
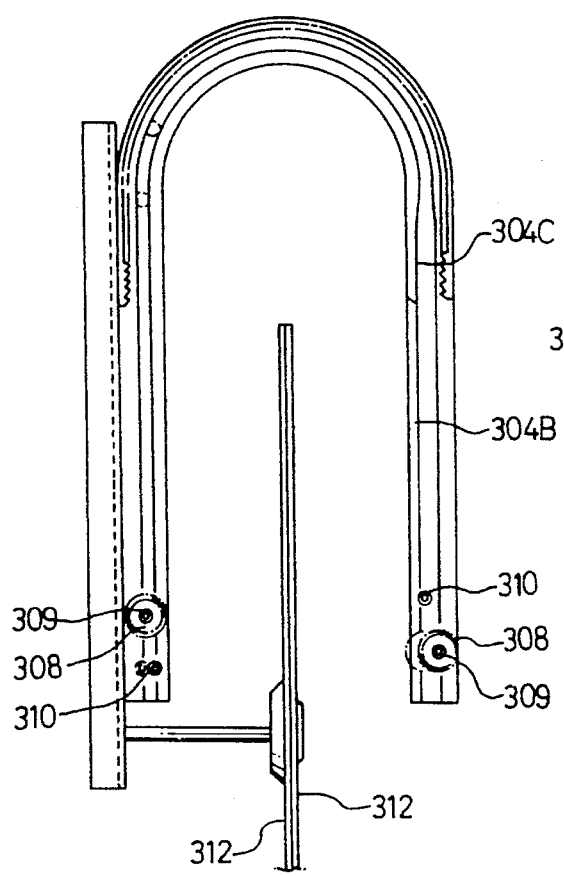
FIG. 14 is a schematic left-sided view of FIG. 13.
Figure 15:
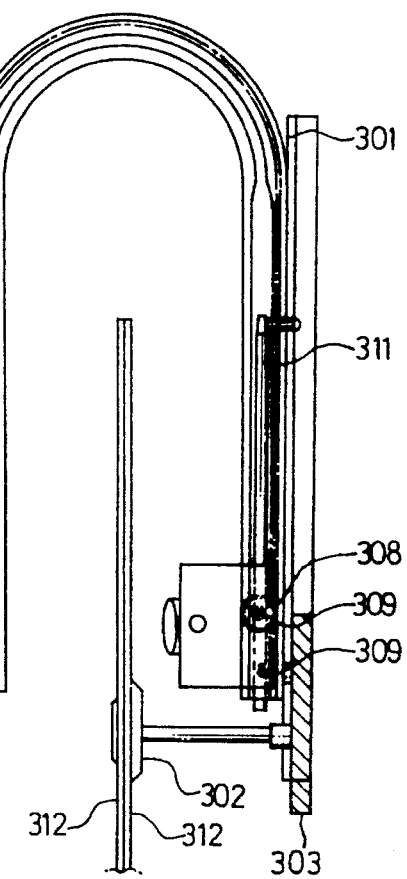
FIG. 15 is a schematic right-sided view of FIG. 13.

The control method for the operation of the embodiment of the present invention as described above is described with reference to FIGS. 11A and 11B as follows.

First of all, if a disc 10 selected to be reproduced is inserted into the turntable 1 (at step 201), the sliding motor 108 and the slope compensating and turning compatible motor 105 start rotating according to driving of a sensor sensing that the disc 10 is inserted (at step 202).

At this time, the pickup carriage 106 moves to a reproducing position of disc 10 by the rotation of the sliding motor 108 and then waits. The slope compensating and turning compatible motor 105 rotates the worm gear 116 on the turning plate 115 to the position where the sensing hole 133 of the left-sided turning plate 114 is sensed by the photo sensor 132 and then is stopped.

After performing initialization at the step 202, it is determined that the photo sensor 132 is "on" (at step 203).

According to the above determined result, performing a play mode (at step 204) or setting a disc reproducing position (at step 202) is selectively carried out.

That is, if the photo sensor 132 is "on" the play mode is performed. During performing the play mode, the sliding motor 108 is rotated at a constant speed, and at the same time, the spindle motor 2 for rotating the disc 10 is driven, thereby moving the pickup carriage 106 from the inner side of disc to the outer side at a proper speed to reproduce the data. At this time, in case that the disc 10 is sloped, the turning plate 115 is moved forwardly and backwardly by driving the slope compensating and turning compatible motor 105 to compensate the slope, thereby performing the adjustment within the "B-C-D-E" interval of the cam curve 118.

Also, if "off" state of photo sensor 132 is sensed by a determined result of the step 203, step 202 is again performed.

After the reproduction of disc lower side 10a is completed by performing the step 204 (at step 205), the position of turning plate 115 for turning the pickup carriage 106 should be set (at step 208). At this time, if the reproduction of the disc lower side 10a is not yet finished, the step 204 is again performed to again perform the play mode corresponding to the remaining portion, and then step 208 is performed.

However, when a key for turning into the disc upper side 10b is received during reproducing of the disc lower side 10a (at step 206), the sliding motor 108 is rotated at a tripled speed, thereby quickly moving the pickup carriage 106 to a turning position of the disc outer circle (at step 207), and then the step 208 is performed.

If the pickup carriage 106 reaches the position finishing the reproduction of disc 10 and is ready for turning, the sliding motor 108 is turned "off" and the slope compensating and turning compatible motor 105 is turned "on", so that a position of turning plate is set to a position inserting the pickup carriage 106 into the pickup synchronizing holes 114a and 115a on the turning plates 114 and 115 (at step 208). Meanwhile, the operation of the spindle motor 2 and the object lens 107 within the pickup carriage 106 is stopped (at step 208).

In this state, the pickup carriage 106 is at the "II" position of FIG. 7. At this time, the photo sensor 132 is operated to identify the position setting of the turning plates 114 and 115 needed for turning of pickup carriage 106 (at step 209).

After the upper and lower frames 121 and 122 are at a level by detecting the position of sensing hole 133 of the turning plate 114 by the photo sensor 132, the sliding motor 108 is again rotated to turn the pickup carriage 106 until the guide rollers 111 and 112 are inserted into the pickup synchronizing holes 114a and 115a of the turning plates 114 and 115 (at step 210). At step 211, it is identified that the protruded pin 106a of the pickup carriage 106 is in contact with the pickup sensing switch 134, with the pickup carriage 106 being sufficiently inserted into the pickup synchronizing hole 114a on the turning plate 114.

After it is determined that the pickup carriage 106 is accurately mounted within the pickup synchronizing hole 114a of the turning plate 114, with the pickup sensing switch 134 being in contact with the protruded pin 106a of the pickup carriage 106 at step 211, if sensing is not done yet, step 210 is performed, thereby readjusting the accurate position of the pickup carriage 106. If it is identified that the pickup sensing switch 134 is accurately positioned at the turning position by being in contact with the protruded pin 106a, the sliding motor 108 is stopped, and only the slope compensating and turning compatible motor 105 is rotated counterclockwise by a semicircle, so that turning of the pickup carriage 106 with the turning plate 114 is performed (at step 212).

The completion of turning is identified by sensing the position of sensing hole 133 on the opposite side by the photo sensor 132 (at step 213).

Also, when it is determined that the photo sensor 132 senses the position of sensing hole 133 at step 213, if it is not sensed yet, step 212 is performed. If the completion of accurate turning is identified by sensing the sensing hole 133 by the photo sensor 132, the sliding motor 108 is quickly rotated counterclockwise, thereby separating the pickup carriage 106 from the turning plates 114 and 115 (at step 214).

At this time, the slope compensating and turning compatible motor 105 is in a stopped state. After the pickup carriage 106 is come out from the turning plates 114 and 115, while it continuously moves to the inner side of the disc upper side 10b, the turning plates 114 and 115 keep a 180° rotated state to be ready for slope compensation.

At this time, the pickup carriage 106 moves to inner side of the disc 10 to search and go to a reproducing position of the disc upper side 10b (at step 215), and accurately identifies the position and then performs the play mode (at step 216).

That is, if the reproducing signal switch is turned "on", a play mode is soon performed to reproduce the disc upper side 10b (at step 216). At this time, the spindle motor 2 is backwardly rotated and on the other hand, the sliding motor 108 is forwardly rotated, thereby performing playing, and the level of upper and lower frames 121 and 122 is adjusted within the interval "E-F-G-H-A" of the cam curve 118 by forward and backward rotation according to slope direction due to disc deflection using the slope compensating and turning compatible motor 105.

Figure 6:
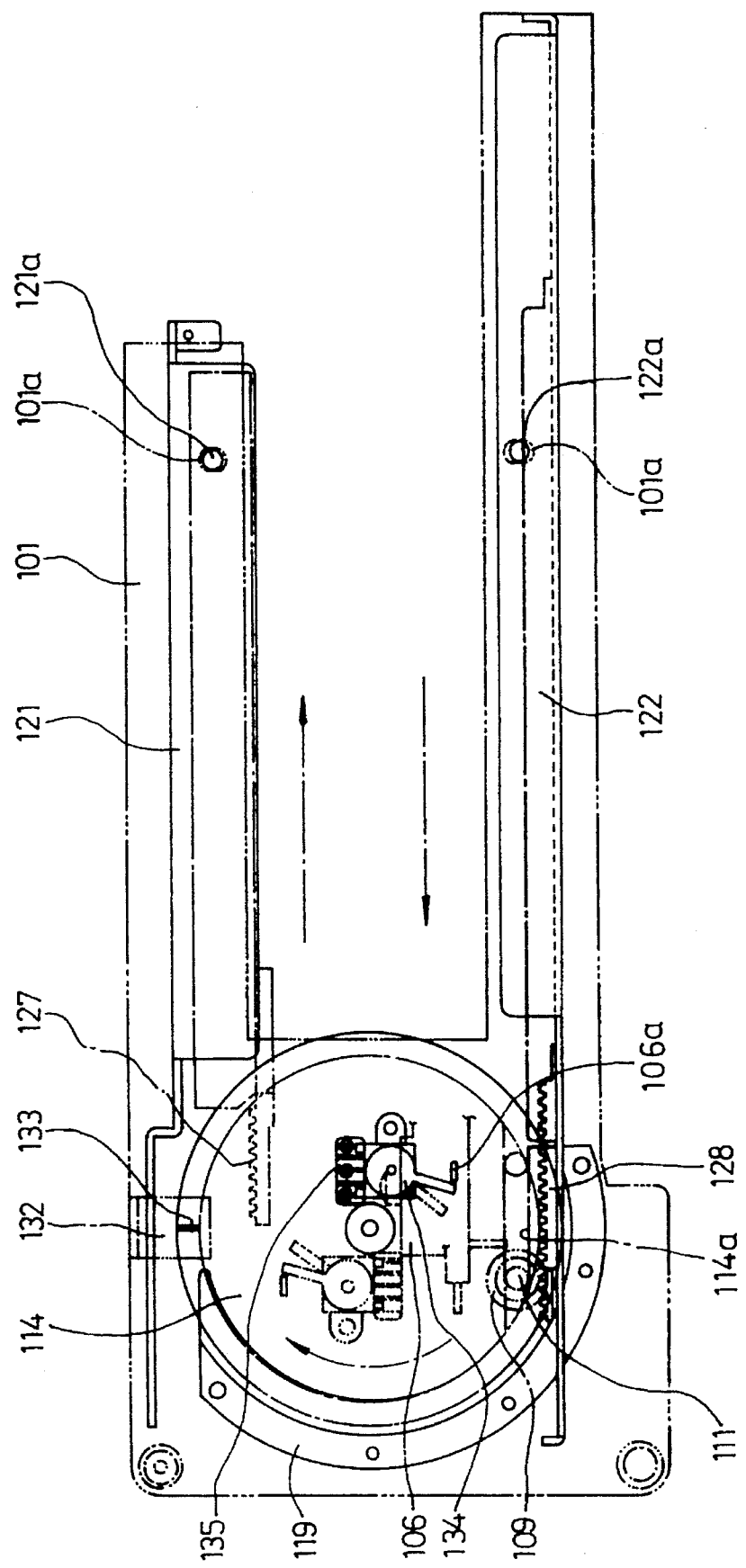
FIG. 6 is a schematic left-sided view of FIG. 5.

The pickup carriage 106 which has orderly or selectively reproduced the disc lower side 10a and the disc upper side 10b as described above reaches the pickup sensing switch 134 whose mounted position is switched by 180° by the rotation of turning plate 114 as shown in FIG. 6, thereby selecting continuous reproduction of opposite side or completion of playing (at step 218).

Here, when continuous reproduction is to be performed, turning is prepared in the same order as in the above description. Such a turning and reproducing step can be easily understood since it has been sufficiently described in the repeated step after step 208.

As described above in detail, in the above-described embodiment of the present invention, only a sliding motor independently driven is comprised within the pickup carriage, and the slope compensating and turning compatible motor can control the turning plate in the outside of the pickup carriage and the turning is effectively performed within turning space of pickup carriage or small area. Accordingly, there are several advantages such as lightness of pickup carriage and the special turning method, and also convenience in simultaneously controlling the upper and lower slope adjustment in the outside of the pickup carriage, a quick search according to the lightness of pickup carriage, and the great reduction of power consumption of motor.

Also, another embodiment according to the present invention is shown in FIGS. 12 through 15. The both-sides playing optical disc player according to this embodiment comprises: a spindle motor 303 fixed on supporting means 301; a turntable 302 fixed on the upper portion of the shaft of spindle motor 303; a pickup carriage 306 mounting pickup means 307; U-shaped turning means 304 and 305 mounted on the both sides of supporting means 301 to turn the pickup carriage 306; U-shaped racks 304A and 305A; a pinion 308 connected to the U-shaped racks 304A and 305A by being fixed to the both ends of the rotation synchronizing shaft 307A passing the pickup carriage 306; guide rollers 309 and 310 mounted on the both sides of the pickup carriage 306 to be moved along the upper and lower roller guide portions 304B, 304C, and 305B of the U-shaped turning portions 304 and 305; and upper and lower guide elements 311 for guiding the pickup carriage 306 during horizontal movement in the upper and lower sides.

Also, the process of assembling the device according to the above-mentioned another embodiment with flexible cable according to other objects is described in detail. The spindle motor 303 is mounted in the supporting means 301, and the turntable 302 is combined in the spindle motor 303, and the U-shaped turning portions 304 and 305 and the lower guide element 311 are mounted in both sides of the spindle motor 303.

Figure 16:
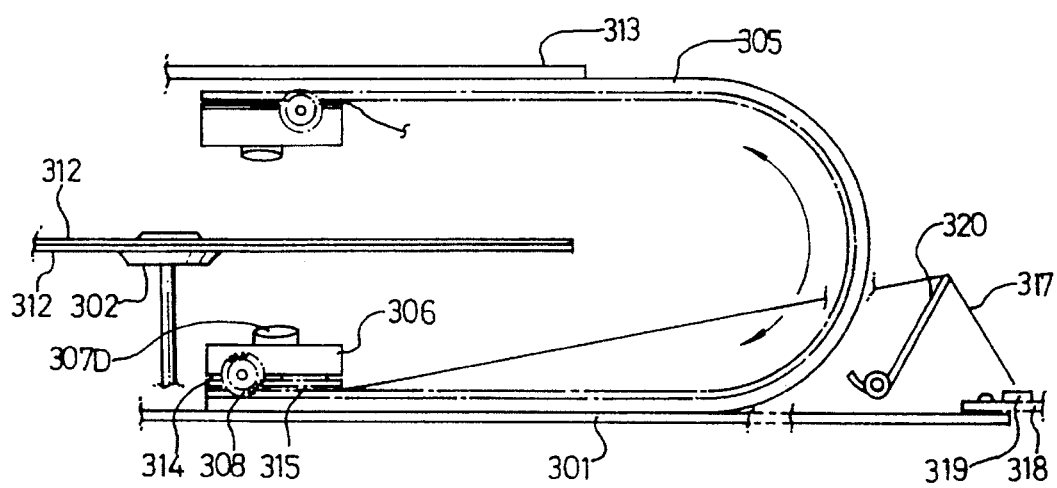
FIG. 16 is a schematic side view illustrating connected structure and operation description of flexible cable according to the present invention applied in the above another embodiment.

And, as shown in FIG. 16, an RF board 318 is mounted. At this time, the connector 319 and the spring 320 are combined in the RF board 318.

A top cover 313 is mounted on the both-sided U-shaped turning portions 304 and 305. At this time, the upper-sided guide element 311 is previously mounted in the top cover 313.

Then, the pickup carriage 306 having an inserted flexible cable 317 is combined, and the pickup means 307 is mounted in the pickup carriage 306 by the hinge 307B. Then, after the rotation synchronizing shaft 307A is inserted, the pinion 308 is pushed and inserted in the left and right ends of the rotation synchronizing shaft 307A and also a pair of front guide rollers 309 are rotatably combined. At this time, the rotation synchronizing shaft 307A is formed to be rotated together with the pinion 308.

Also, the rear guide rollers 309 and 310 are additionally combined in the left and right sides of the pickup carriage 306. At this time, the left-sided guide roller 310 for the upper roller guide portion 304B is constituted to be rotated around the rotation synchronizing shaft 307A, thereby enabling the level adjustment.

As shown in FIG. 16, the pickup carriage is fixed with a print circuit substrate 314, which is fixed with the connector 315 and a jump line 316. The connector 315 is fixed with one end of the flexible cable 317, which is drawn out by passing the jump line 316.

Then, the other end of the flexible cable 317 is fixed on the connector 319 over a spring 320.

In the left U-shaped turning portion 304, the upper roller guide 304B is protruded to guide the pickup carriage 306 on the upper-portion of the optical disc 312, and the rack 304A for meeting the upper roller guide 304B during turning is formed.

In the right U-shaped turning portion 305, the rack 305A is overall formed in U shape, and a roller guide 305B is formed.

The flexible cable 317 is connected to supply the reproducing signal read out by the pickup means 307 to the RF board 318. Accordingly, there is elasticity, but the flexible cable 317 can be broken according to the radius of curvature. If the break is generated, the lifetime of deck is shorten, and accordingly, it is preferred that the lifetime is lengthened by minimizing the radius of curvature. The constitution of flexible cable according to other object of the present invention is described with reference to FIGS. 16 through 19.

As described above, the connected structure of flexible cable shown in FIGS. 16 and 17 is as follows. The print circuit substrate 314 is fixed on the lower surface of the pickup carriage 306, and are fixed with the connector 315 and the jump line 316. The flexible cable 317 is fixed in the connector 315, and is drawn out by being passed through the jump line 316, and then is fixed on the connector 319 over the spring 320 fixed in the RF board 318.

The connected structure of the flexible cable of FIG. 18 is as follows. A guide hole 314A is formed in the print circuit substrate 314, and one end of the flexible cable 317 is connected to the connector 315 by passing the guide hole 314A. Its other end is constituted as shown in FIGS. 16 and 17.

In the connected structure of the flexible cable shown in FIG. 19, a predetermined length of rubber 321 is attached on the lower surface of the print circuit substrate 314, thereby elastically supporting one end of the flexible cable 317 fixed in the connector 315, and the other end of the flexible cable 317 is connected as shown in FIGS. 16 and 17.

The function and effect in another embodiment of the present invention as described above is described as follows.

After reproducing the lower side of the optical disc 312, the pickup carriage 306 is turned to reproduce the upper side. First of all, during reproducing the lower side, the pickup carriage 306 is slid from the inner side of turntable 302 to the outer circle of the optical disc 312, thereby performing reproduction.

At this time, for reproduction, if a sliding motor (not shown) within the pickup carriage 306 transfers a power to the pinion 308 (assuming this speed as 1-multiplied speed), the pickup carriage 306 reads a signal by the pinion 308 and the left U-shaped rack 305A, and is horizontally moved by being guided by the lower guide element 311.

During reproducing the lower side, the left level of the pickup carriage 306 is leveled by the line contact with the lower roller guide 304C of the left U-shaped turning portion 304 by the left guide roller 309 for the lower side.

And, during reproducing the upper side, the right level is leveled by the line contact with the upper roller guide 304B by the left guide roller 310. Here, the roller guide 304B performs the function only in the leveled interval of the upper side, i.e., the reproducing interval. Also, during turning, it is performed at a multiplied speed by the left U-shaped rack 304A and the right U-shaped rack 305A. At this time, two right guide rollers 309 and one left guide roller 309 are guided by the roller guides 305B and 304C, so that the rack at the U-shaped turning interval is normally in gear with the pinion 308, thereby being turned.

The roller guide portion 305B in the right U-shaped turning portion 305 has no relation with the right guide roller 309 in the horizontal interval and the pickup carriage 306 is guided by the lower guide element 311 and only in turning, i.e., in a state deviated from the lower guide element 311, the right guide roller 309 and the roller guide 305B are in contact by rolling-friction. In the left U-shaped turning portion 304, the left guide roller 309 and the roller guide 304C are met at its lower portion, and the left guide roller 310 and the roller guide 304B have rolling-friction at its upper portion.

At this time, the reproducing signal read out by the pickup means 307 is transferred to the connector 319 and the RF board 316 by the flexible cable 317.

As described above in detail, in the above-described embodiments of the present invention, only a sliding motor independently driven is comprised within the pickup carriage, and the slope compensating and turning compatible motor can control the turning plate in the outside of the pickup carriage and the turning is effectively performed within turning space of pickup carriage or small area. Accordingly, there are several advantages such as lightness of pickup carriage and the special turning method, and also convenience in simultaneously controlling the upper and lower slope adjustment in the outside of the pickup carriage, a quick search according to the lightness of pickup carriage, and the great reduction of power consumption of motor. Also, in another embodiment, the number of elements are further minimized and the radius of curvature of flexible cable is minimized, thereby making the deck have a reduced weight and a smaller size. The pickup carriage is easily turned using the U-shaped turning portion and the roller, thereby simplifying the constitution of turning device, and improving the reliability.

What is claimed is:

1. A both-sides playing optical disc player comprising:

a pair of upper and lower supporting means;

a pickup carriage comprising a single sliding motor, at least a single power transfer gear for transferring a power of said sliding motor, pickup means, and first guide means;

at least a pair of upper and lower rack elements respectively mounted in said upper and lower supporting means, for moving said pickup carriage at least within a disc reproducing position by being in gear with said power transfer gear of said pickup carriage;

second guide means mounted in said upper and lower supporting means, for guiding movement of said pickup carriage within the disc reproducing position by cooperating with said first guide means of said pickup carriage;

turning means for rotating said pickup carriage at a reproduction completed position along a semicircle near an end of a disc around an axis perpendicular to a moving direction of said pickup carriage and parallel to a side of the disc; and means guiding said pickup carriage during rotation thereof, said first guide means comprising a guide hole formed in a moving direction of said pickup carriage, and at least a pair of front and rear guide rollers provided in an outside of said power transfer gear;

said second guide means comprising at least a pair of upper and lower guide elements being in sliding-contact with said guide hole, for guiding said pickup carriage along a moving direction within the reproducing position of the both sides of the disc, and at least a single upper roller guide being in rolling-contact with one of said guide rollers, for guiding and supporting said pickup carriage; and said turning means comprising a turning plate having a pickup synchronizing hole for inserting said guide roller thereinto when said pickup carriage is moved to a turning position after completion of reproduction, and means for rotating said turning plate, and a guide plate for preventing deviation of said pickup carriage during turning, wherein said upper and lower supporting means comprise a pair of upper and lower frames respectively fixed with said upper and lower rack elements and said second guide means, a pair of left and right brackets for connecting one-sided ends of said upper and lower frames with a hinge to rotate said upper and lower frames within said upper and lower supporting means, and a guide shaft fixed in other ends of said upper and lower frames; and said turning plate further comprises a guide shaft receiving cam curve constituted by a variable curve portion for compensating a slope according to deflection of the disc by rotating said upper and lower frames, and a concentric circle portion excluding said variable curve portion, with said turning plate being rotated by said means for rotating said turning plate and said power transfer gear to position said guide shaft on said cam curve at a position corresponding to deflection of said disc.

2. A both-sides playing optical disc player as claimed in claim 1, wherein a sensing hole indicating a turning position of said pickup carriage is provided in said turning plate, a photo sensor is provided in a bracket to sense said sensing hole, with said turning plate being positioned at a turning position where said frames are in a level after completion of reproduction.

3. A both-sides playing optical disc player as claimed in claim 1, wherein said pickup carriage is provided with a protruded pin and said turning plate is provided with a pickup carriage sensing switch, whereby a turning position of pickup carriage is sensed.

4. A both-sides playing optical disc player as claimed in claim 1, wherein in turning, a pair of stopper pins and stopper protrusions are respectively provided in said turning plate and said supporting means by 180° interval to inhibit an unnecessary rotation of said turning plate so as to secure an accurate turning position of said turning plate.

* * * * *